US006995489B2

(12) United States Patent
Ehrhart et al.

(10) Patent No.: US 6,995,489 B2
(45) Date of Patent: Feb. 7, 2006

(54) ELECTRIC MACHINE

(75) Inventors: Peter Ehrhart, München (DE); Anton Mueller, Tutzing (DE)

(73) Assignees: Magnet-Motor Gesellschaft fur, (DE); Magnet-Motorische Technik mbH, (DE)

( * ) Notice: Subject to any disclaimer, the term of this patent is extended or adjusted under 35 U.S.C. 154(b) by 0 days.

(21) Appl. No.: 10/455,271

(22) Filed: Jun. 3, 2003

(65) Prior Publication Data

US 2004/0021396 A1    Feb. 5, 2004

(30) Foreign Application Priority Data

Jun. 4, 2002    (DE) .................. 102 24 776

(51) Int. Cl.
*H02K 21/12*    (2006.01)
*H02K 15/16*    (2006.01)

(52) U.S. Cl. .................. 310/156.31; 310/156.27; 310/156.28; 310/271

(58) Field of Classification Search .......... 310/89, 310/91, 85, 86, 87, 88, 43, 45, 271, 156.27, 310/156.28, 156.31
See application file for complete search history.

(56) References Cited

U.S. PATENT DOCUMENTS

| | | | |
|---|---|---|---|
| 3,742,595 A * | 7/1973 | Lykes | 29/596 |
| 3,836,954 A * | 9/1974 | Adam | 362/310 |
| 4,781,986 A | 11/1988 | Alvino | |
| 4,855,630 A * | 8/1989 | Cole | 310/156.28 |
| 4,879,485 A * | 11/1989 | Tassinario | 310/156.19 |
| 4,930,201 A | 6/1990 | Brown | |
| 5,122,704 A * | 6/1992 | Blakeley et al. | 310/54 |
| 5,128,575 A | 7/1992 | Heidelberg et al. | |
| 5,485,045 A * | 1/1996 | Canders et al. | 310/156.31 |
| 5,661,351 A * | 8/1997 | von der Heide et al. | 310/67 R |
| 5,723,933 A | 3/1998 | Grundl et al. | |
| 5,760,506 A * | 6/1998 | Ahlstrom et al. | 310/74 |
| 5,962,938 A * | 10/1999 | Bobay et al. | 310/67 R |
| 6,029,338 A | 2/2000 | Heil et al. | |
| 6,229,243 B1 * | 5/2001 | Roesel et al. | 310/261 |
| 6,300,693 B1 * | 10/2001 | Poag et al. | 310/54 |

FOREIGN PATENT DOCUMENTS

| | | |
|---|---|---|
| DE | 28 39 451 C2 | 4/1987 |
| DE | 28 39 413 C2 | 7/1987 |
| DE | 36 22 231 A1 | 1/1988 |
| DE | 32 13 172 C2 | 11/1989 |
| DE | 36 07 648 C2 | 3/1990 |
| DE | 39 43 237 A1 | 6/1991 |
| DE | 41 42 461 A1 | 6/1993 |
| DE | 44 14 527 C1 | 8/1995 |

(Continued)

OTHER PUBLICATIONS

Horst Kuchling, Taschenbuch der Physik, seventeenth addition, ISBN 3-446-21760-6, p. 616, table 10, coefficient of thermal conduction of hard materials, no date.

*Primary Examiner*—Tran Nguyen
(74) *Attorney, Agent, or Firm*—Bachman & LaPointe, P.C.

(57) ABSTRACT

An electric machine (2) comprising a rotor (4) and a stator (6) arranged coaxially therewith, at least one of said rotor (4) and stator (6) being formed of a plurality of parts and there being provided a bandage (16) holding together the plurality of parts of said rotor and/or stator (6), wherein the bandage (16) is formed of an electrically non-conducting fiber material having a coefficient of thermal expansion similar to the coefficient of thermal expansion of the parts of said rotor (4) and/or stator (6).

16 Claims, 2 Drawing Sheets

FOREIGN PATENT DOCUMENTS

| | | |
|---|---|---|
| DE | 44 42 869 A1 | 6/1996 |
| DE | 197 36 710 A1 | 2/1999 |
| EP | 0 282 876 B1 | 6/1992 |
| EP | 0 802 609 A1 | 10/1997 |
| EP | 0 854 558 A2 | 7/1998 |
| EP | 0 977 340 B1 | 10/2002 |
| GB | 2 296 997 A | 7/1996 |
| WO | WO 91/10277 | 7/1991 |

* cited by examiner

ELECTRIC MACHINE

BACKGROUND OF THE INVENTION

The present invention relates to an electric machine comprising a rotor and a stator arranged coaxially therewith, at least one of said rotor and stator being formed of a plurality of parts and there being provided a bandage holding together the plurality of parts of said rotor and/or stator.

The present invention in general relates to the simplification of the construction and manufacture of electric machine, in particular electric motors and generators having internal or external rotors composed of individual parts as well as stators composed of individual parts, respectively. These individual parts, in conventional manufacture, are joined together using mechanically positive or form-fit connections, for example screws or mutually engaging parts etc. This kind of connection is complex in terms of working and assembly. Furthermore, there is the fact that some materials, in particular materials used for the permanent magnets, are relatively difficult to work.

A bandage circumferentially enclosing the individual parts is a suitable alternative to such mechanical positive connections. The bandage encloses the individual parts and holds the same together. The bandage is basically capable of withstanding relatively high forces, especially the centrifugal forces arising with a rotor. The bandage may optionally also be provided in combination with mechanical positive connections for retaining the individual parts.

The bandage provided on the outer circumference of the stator or rotor, however, increases the diameter thereof to a not insubstantial extent. Especially with internal rotors in which the bandage is arranged in the air gap between rotor and stator, the thickness of the bandage has a decisive effect on exploitation and efficiency of the electric machine. The designing engineer strives to keep this air gap as small as possible. Even if the air gap can be reduced by just a tenth of a millimeter, this has considerable effects on the power and efficiency of the machine. Because of the known high strength of carbon fiber materials, carbon fiber material was thus used to make the bandages. In case of electric machines of usual size, the thickness of this bandage is typically between 0.5 and 5 mm, which is already inadmissibly large for some applications. In this context, it is to be pointed out in particular that this problem does not only exist with such electric machines in which the bandage is disposed in the air gap between rotor and stator, but also in case of such electric machines in which the bandage is arranged on the outer circumference, e.g. around the outside of the external rotor. In this event, the thickness of the bandage results in a greater overall diameter of the electric machine, which may also be undesirable for some applications.

The object of the present invention thus consists in reducing the thickness of the bandage of known electric machines of the type indicated hereinbefore.

SUMMARY OF THE INVENTION

This object is met according to the invention in that the bandage is formed of an electrically non-conducting fiber material having a coefficient of thermal expansion that is similar to or substantially corresponds to the coefficient of thermal expansion of the parts of the rotor and/or stator.

The reason therefor is that it has turned out that the low coefficient of thermal expansion of carbon fiber material is disadvantageous for the bandage thickness, i.e. especially in case of machines subject to high thermal loads, the low coefficient of thermal expansion of the carbon fiber material leads to an excessive bandage thickness as, in addition to the normal forces to be taken up by the bandage, the forces of thermal mismatching between bandage material and the material of the individual parts of rotor and/or stator have to be taken up as well. It has turned out that fiber materials, which fundamentally have lower strength than carbon fiber material, may nevertheless lead to definitely thinner bandages, provided that the coefficient of thermal expansion thereof is within the range of the coefficient of thermal expansion of the stator and rotor, respectively. The coefficient of thermal expansion of the individual parts of a rotor or stator typically is in a relatively high range with approx. $6-9 \times 10^{-6}$. In the sense of the present invention, a similar coefficient of thermal expansion is understood to be a coefficient of thermal expansion that is approximately in the same order of magnitude, i.e. that is greater or smaller than the coefficient of thermal expansion of the rotor or stator at the most approx. by a factor of 10, preferably a factor of 5, still more preferably by a factor of 2 and most preferably by a factor of 1.

Providing the electrically non-conducting fiber material is on the one hand advantageous due to the reduction of eddy current losses and on the other hand has the function of avoiding excessive heating and thus thermal expansion of the bandages as a result of the eddy currents. In the extreme, the eddy currents in case of a conductive material could lead to different thermal expansion of the bandage with respect to the stator or rotor, respectively, which could deprive the stator or rotor of its required structural strength.

The material preferably is characterized by a high modulus of elasticity, due to which high retention forces can be achieved with little material expenditure (i.e. thin bandage). The modulus of elasticity preferably is higher than 100 GPa ($10 \times 10^3$ N/mm$^2$), preferably higher than 200 GPa, preferably higher than 300 GPa and most preferably higher than 400 GPa.

Preferably, the bandage is formed of a ceramic fiber material. Ceramic fiber materials advantageously unite a high modulus of elasticity with a suitable coefficient of thermal expansion. Other fiber materials, for example glass fiber material, are generally possible as well. However, the ceramic fiber material has a still further important advantage residing in the modulus of elasticity thereof. The ceramic fiber bandage expands only relatively little under the application of force, which with respect to the rotor means that the biased bandage, under the effect of centrifugal forces, expands in minimum manner only, or that the bias may be selected to be so large that no or only minimum expansion of the bandage occurs under the effect of centrifugal forces. It is thus ensured that the bandage maintains the structural integrity of the rotor or stator irrespective of the forces acting thereon, and that the individual parts of the rotor and/or stator are fixedly positioned with respect to each other. In practical application, this property in turn serves to achieve a particularly thin bandage. Movement within and between the individual parts is largely prevented thereby, so that effects of fatigue in the rotor materials, and in particular in case of possibly present adhesive bonds, are excluded or reduced extremely.

Ceramic fiber materials are readily commercially available and are conventionally employed for thermal insulations.

The bandage preferably is arranged on the rotor or stator with a bias. The bias ensures the structural integrity of the rotor or stator, in particular also for the event that the bandage heats up in a certain temperature range with respect to the rotor or stator. The application of the bandage with a bias may be effected by winding it around the stator or rotor while biasing the fiber material. As an alternative, separately prefabricated bandages may be mounted on the rotor or stator by "shrinking" them on. The present invention thus permits simpler manufacture by such shrinking than in case of bandages of carbon fiber material. Shrinking on is basically also possible with bandage material having no or just little thermal expansion, namely by cooling the inner part and thus reducing the size or diameter thereof. The possibility of enlarging the bandage in its diameter by application of heat allows either a particularly great difference in diameter between inner part and bandage or, optionally, to refrain from cooling of the inner part.

The bandage preferably has the fiber material provided in a plastics matrix. The plastics matrix may be formed, for example, of a synthetic resin material or another plastics material. The plastics material may be brought together with the fiber material either prior to, during or after winding of the bandage. Preferably, the plastics material is introduced into the fiber material already prior to processing. This provides for a very uniform distribution of the plastics material in the fiber material. Fiber material in a plastics matrix is in part already commercially offered. Such material is referred to as "prepreg".

The bandage preferably is designed in the form of a frictional or force-fit connection from rotor to rotor flange. It results on the basis of simple static considerations that the transmission of force from the rotor to the rotor flange is effected most efficiently in the region of the outer circumference of the rotor, i.e. in the region where the bandage is provided. The bandage, which is provided as structural part, in particularly preferred manner may constitute at the same time the frictional connection from the rotor to the rotor flange. It is pointed out in particular that this feature is deemed to be of independent inventive character, irrespective of the material chosen for the bandage. In addition, it is preferred that the rotor flange is formed integrally with the bandage. It is thus possible, for example, to form the rotor flange e.g. of fiber material in a plastics matrix integrally with the bandage. It is also possible to make the rotor flange e.g. of a combination of fiber material/plastics matrix and another material, e.g. metal.

Preferably, the materials for the bandage and the rotor or stator are selected such that the rotor or stator on the one hand and the bandage on the other hand have substantially the same coefficient of thermal expansion. The substantially same or identical coefficients of thermal expansion are understood to comprise cases in which the coefficient of thermal expansion of the bandage differs from the average coefficient of thermal expansion of stator or rotor merely by 50%, preferably merely by 20%, preferably merely by 10% and most preferably by merely 5%. In the ideal case, there is exact identity between the coefficients of thermal expansion. The lower the difference in the coefficients of thermal expansion, the thinner the possible design of the bandage. Identical coefficients of thermal expansion can be achieved, for example, by corresponding material selection or constructional measures within the bandage. For example, it is basically possible to use various ceramic fiber materials having different coefficients of thermal expansion, which may be used in "pure" form or in a suitable mixture to obtain the resulting coefficient of thermal expansion. As an alternative, it is possible to combine ceramic fibers with other fiber materials, e.g. glass fiber or carbon fiber, in order to obtain desired properties. The coefficient of thermal expansion of the bandage may be influenced to a certain degree also be utilization of different materials for the plastics matrix. Another possibility in addition to material selection resides in the arrangement of the fiber direction; it is possible for example, to take influence on the coefficient of thermal expansion in the circumferential direction of the bandage by way of the winding direction of the fibers in relation to the circumferential direction of the rotor or stator. An exact as possible matching of the coefficients of thermal expansion is particularly important especially in case of internal rotor machines. Matching of the coefficients of thermal expansion may also be effected by suitable choice of the materials in the stator or rotor.

The bandage preferably is fluid-tight. The matrix material preferably is selected such that the bandage is fluid-tight. The bandage preferably is provided with a fluid-tight film, preferably a Kapton film, to provide fluid sealing. The fluid on the one hand may be gasses or on the other hand liquids, such as e.g. water or oil. This is advantageous in particular with fluid-cooled machines. The bandage then may constitute at the same time the outer confinement for a fluid flow channel or a fluid chamber. The Kapton film, for example, may be introduced into the bandage together with the fiber material and the plastics matrix material during manufacture of the bandage or, as an alternative, may be provided as internal or external layer on the inner circumference or the outer circumference of the bandage either prior to or after manufacture of the bandage.

The bandage preferably has a unidirectional fiber material arranged in circumferential direction. Unidirectional fiber material is understood to be fiber material having the individual fibers arranged substantially parallel with respect to each other. The bandage then is capable of taking up particularly high forces in circumferential direction. In addition thereto, the coefficient of thermal expansion of the fibers then substantially determines the coefficient of expansion of the bandage in circumferential direction, whereas the plastics matrix material substantially determines the coefficient of thermal expansion in axial direction.

The bandage preferably comprises unidirectional fiber material arranged at an angle with respect to the circumferential direction. This is preferred in particular if the orientation of the fiber material is to be used for modelling the coefficient of thermal expansion in circumferential direction and/or if the bandage is designed for connection to the rotor flange or formed integrally with the rotor flange. Suitable values of the angles are 45°□15°. It is also possible to use other fiber material than unidirectional fiber material. For example, there are mats of fiber material in which individual fiber materials are "woven" together, or prefabricated fiber materials in which the fibers are arranged at different angles with respect to each other.

Preferably, the bandage may have several layers of fiber material. Unidirectional layers may then be mixed with non-unidirectional fiber layers, unidirectional fiber layers arranged in circumferential direction may be combined with unidirectional fiber layers arranged at an angle to the circumferential direction etc. in order to obtain desired properties with respect to the coefficient of thermal expansion and with respect to structural properties, respectively.

The rotor preferably is an internal rotor. For this application, the present invention is particularly suitable because of the afore-mentioned aspect of the bandage thickness in the air gap between stator and rotor.

The rotor preferably is an external rotor. For this application, the present invention is particularly suitable since a bandage as thin as possible has to withstand high radial forces. The rotor preferably carries permanent magnets. The utilization of the bandage in connection with permanent magnets provides for a substantial decrease in costs and facilitation of mounting the permanent magnets to the rotor.

The stator preferably is an internal stator. In this case, the arrangement of the bandage in the air gap between stator and rotor again plays an important role with regard to the thermal expansion of the stator during operation.

BRIEF DESCRIPTION OF THE DRAWINGS

The invention and further developments of the invention will be explained in more detail hereinafter with reference to an embodiment shown in the drawings, wherein.

DETAILED DESCRIPTION

Figure 1:
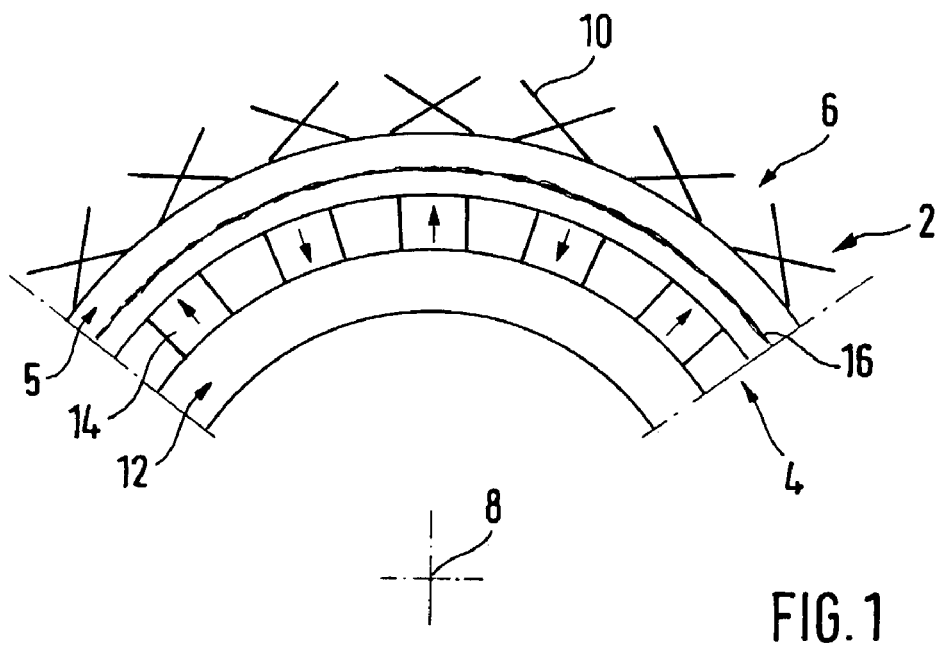
FIG. 1 is a partial view of an electrical internal rotor machine with radially magnetized permanent magnets according to the invention.

FIG. 1 illustrates the partial view of an electric machine 2, comprising a rotor 4 and a stator 6. Rotor 4 and stator 6 are arranged coaxially around a common axis 8. An air gap 5 is provided between rotor 4 and stator 6. The stator 6 carries electric winding coils illustrated schematically by crosses 10. The winding coils are arranged around winding cores (not illustrated in FIG. 1).

The rotor 4 consists of a plurality of individual parts. These include active parts, such as the magnetic yoke 12 and the permanent magnets 14. The magnetic yoke 12, which is of hollow cylindrical configuration in FIG. 1, may serve at the same time as a structural part, i.e. as supporting part for the magnets 14. As an alternative or in addition thereto, there may also be provided additional structural parts. The permanent magnets, which are magnetized in radial direction in FIG. 1 (the direction of magnetization is indicated by the arrows at permanent magnets 14), are subject to high centrifugal forces during operation of the electric machine 2 and thus have to be mounted to the magnetic yoke 12 or other structural parts in correspondingly firm and reliable manner. A bandage 16 provided in the air gap and shown in exaggerated thickness in the representation of FIG. 1, holds the parts 12 and 14 of rotor 4 together.

The bandage 16 preferably consists of a ceramic fiber material in a matrix of synthetic resin. It is also possible to use other non-conducting fiber materials having a coefficient of thermal expansion substantially corresponding to the coefficient of thermal expansion of the rotor. The bandage 16 is attached to the outer circumference of the rotor 4 preferably with a bias and thus holds the individual parts of the rotor 4 safely together. In addition thereto, the individual parts of the rotor 4 may be interconnected by means of other connections, e.g. mechanical positive or form-fit connections, adhesive bonds etc. With such a combination, the bandage 16 may be given a still thinner design.

Ceramic fibers have an advantageous modulus of elasticity, which results only in minimum expansion when subject to forces. This ensures on the one hand that the dimensions of the outer diameter of the rotor are maintained during operation of the electric machine 2 and is especially advantageous if the individual parts of the rotor 4 are adhesively interconnected in addition to the bandage. If the bias of the bandage is chosen such that the bandage, under the influence of centrifugal forces, widens just in minimum manner or that no or just minimum expansion takes place, movement is largely prevented within and between the rotor parts, and effects of fatigue in the rotor materials and especially in case of adhesive bonds are reduced considerably, which is highly advantageous as regards the lifetime of the electric machine 2.

The bandage 16 may be established by winding e.g. directly on rotor 4, biasing the fiber materials employed. As an alternative, the bandage may be formed separately on a winding mandrel, the winding mandrel having preferably a slightly smaller diameter than the outer diameter of the rotor 4. Fiber material and matrix material are brought together already prior to winding or are brought together during winding of the fiber material or after winding of the fiber material. Bringing together the fiber material and the matrix material prior to or during winding is preferred with regard to as good as possible penetration of the matrix material and the fiber material.

After winding of the bandage 16, the bandage 16 or the matrix material is subject to curing. To avoid structural impairment due to inclusion of air, it may be advantageous to subject the wound bandage to vacuum pressure prior to curing in order to thus "draw" air inclusions from the materials. This vacuum pressure can be maintained for a certain period of time. Depending on the matrix material, it may be advantageous to perform the expulsion of air under vacuum pressure at an elevated temperature in order to increase the viscosity of the matrix material. It may also be expedient in general to shape the outside of the bandage. To this end, there may be provided e.g. mold halves arranged preferably in axial symmetry with respect to the winding core or the rotor and having shaping surfaces for the outside of the bandage 16. The curing operation may be carried out e.g. in an autoclave.

It may be favorable for some applications if the bandage 16 is fluid-tight, i.e. gas and/or liquid-tight. This may be achieved on the one hand by suitable material selection for the matrix material. As an alternative and/or in addition thereto, a fluid-tight film may be provided adjacent the bandage. The film may be wound parallel to the individual fiber layers, i.e. such that it is wound spirally between the individual fiber layers with respect to the axis of rotation and is also held by the matrix material.

The bandage 16 may be united with the rotor 4 by shrinking it onto the same. To this end, the bandage 16 may either be heated such that it has an inner diameter that is slightly larger than the outer diameter of the rotor 4, the bandage 16 may be heated and the rotor 4 cooled, or the rotor 4 may be cooled only.

In place of the permanent magnets 14, there may be provided, for example, coil windings around rotor teeth.

It is particularly preferred to provide rotor 4 and stator 6 with similar or identical coefficients of thermal expansion, so that, when the electric machine is subject to thermal loads, the air gap 5 between rotor 4 and stator 6 is maintained substantially with constant thickness.

In the following, there will be described additional embodiments by way of FIGS. 2 to 4, using the same reference numerals for corresponding parts. It it expressly pointed out that general remarks, especially remarks relating to the bandage 16, as made in conjunction with FIG. 1, hold for FIGS. 2 to 4 in corresponding fashion. This holds in particular also for FIG. 4, in which an internal stator is surrounded by a corresponding bandage 16 so that part of the statements made in FIG. 1 on the bandage 16 in relation to the stator 4 can be read on the stator 6 in case of FIG. 4.

Figure 2:
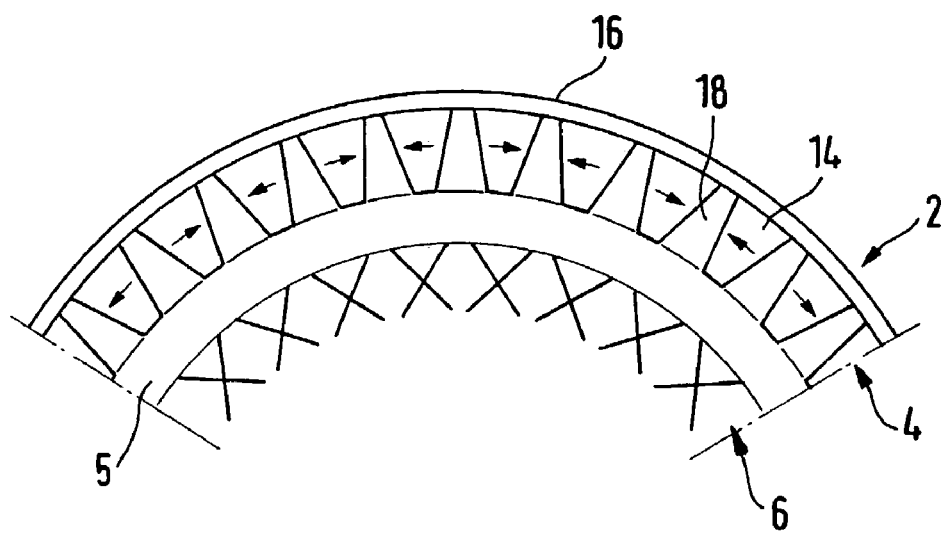
FIG. 2 is a partial view of an electrical external rotor machine with an arrangement of the permanent magnets according to the flux concentration principle.

FIG. 2 illustrates an electromagnetic external rotor machine 2 comprising an external moving part or rotor 4 and an internal stator 6. An air gap 5 is provided between rotor 4 and stator 6. In the embodiment illustrated in FIG. 2, the external rotor 4 has a plurality of permanent magnets 14 which, in combination with flux conducting pieces 18, are arranged in accordance with the flux concentration principle. As an alternative, an arrangement of the permanent magnets 14 in accordance with FIG. 1, or vice versa, could be provided as well. Instead of the permanent magnets 14, rotor teeth having coils wound thereon could be provided as well. FIG. 2 illustrates furthermore the external bandage 16. The external bandage 16 has an effect on the outer diameter of the electric machine 2 of FIG. 2, i.e. the thinner the bandage 16, the smaller the outer circumference of the electric machine 2. However, this also has the advantage that, with identical outer diameter, the air gap may be located radially further outside, thus providing better exploitation of the machine. In comparison therewith, the air gap 5 may be made smaller the thinner the bandage 16 of FIG. 1.

Figure 3:
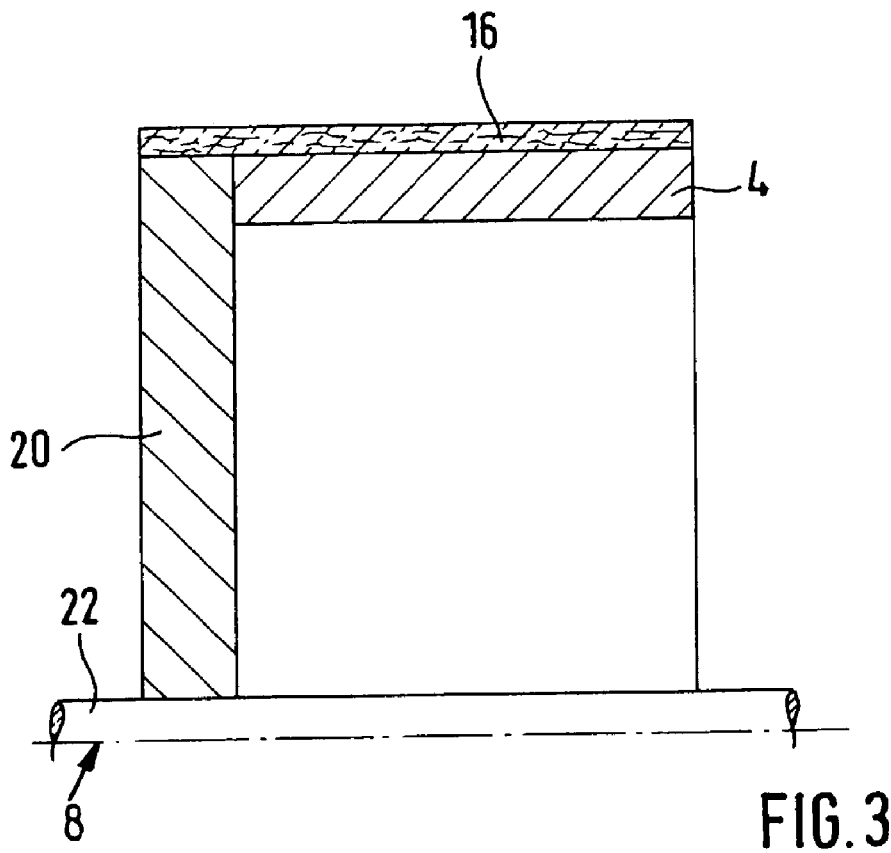
FIG. 3 is a view illustrating the connection between rotor and rotor flange with a bandage according to the invention.

FIG. 3 merely illustrates the rotor 4, the rotor flange 20 and the machine shaft 22, rotor 4 and rotor flange 20 being connected by means of bandage 16. The rotor 4 of FIG. 3 may be both a rotor for an internal rotor machine or a rotor for an external rotor machine. While in the illustration of FIG. 3, the transmission of force takes place in conventional form via the machine shaft 22, it is also possible to effect the transmission of force away from the electric machine or to the same, respectively, in the region of the outer circumference of the rotor 4 or rotor flange 20. Especially in case of the latter design, it may be advantageous to form the rotor flange 20 integrally with the bandage 16.

Figure 4:
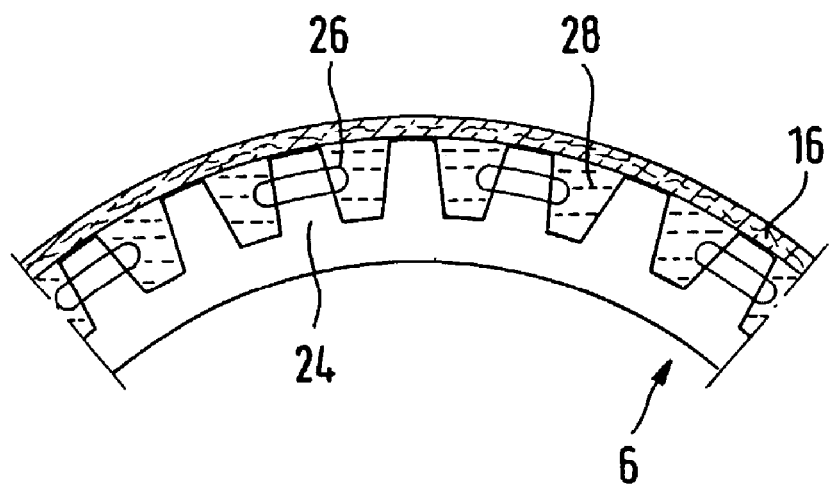
FIG. 4 is a partial view of an electrical internal stator machine having a bandage according to the invention.

FIG. 4 illustrates an internal stator 6 with bandage 16. It is possible to see in particular stator teeth 24 formed with schematically illustrated stator windings 26. Between the stator teeth 24, there are provided fluid channels 28 for internal cooling of the stator. The bandage 16 of FIG. 4 typically does not have to take up centrifugal forces, and due to the matching of the coefficient of thermal expansion of the bandage 16 to that of the stator 6, there are virtually no thermally caused tensile loads occurring in the bandage 16, either. As compared to corresponding bandages of the prior art, bandage 16 thus can be made in a particularly thin design, so that the air gap between internal stator and rotor can be kept extremely thin.

It is particularly preferred to combine the internal stator of FIG. 4 with an external rotor having a bandage according to the invention. Presupposing substantially identical temperature conditions with respect to rotor and stator, a temperature-independent air gap thickness may be assumed. The clearance in air gap 5, which typically is provided constructionally for thermal expansion, is not necessary with such a machine, so that the air gap 5 can be made still thinner. The same holds vice versa for a bandage 16 of ceramic material for an internal rotor machine with external stator which is circumferentially surrounded by a corresponding bandage 16 and has a matching average coefficient of thermal expansion.

It is expressly pointed out that the term "electric machine", as used in the present application, comprises both electric motors (conversion of electric energy to mechanical energy) and current generators (conversion of mechanical energy to electrical energy). In addition thereto, it is expressly pointed out that the term "stator" is not supposed to mean that the stator is cogently non-moving and that the term "rotor" is not supposed to mean that the rotor cogently has to be a rotatable part of the electric machine. Rather, it is very well possible to provide the stator (i.e. the component of the electric machine provided with coil windings) as rotating machine part and the rotor as stationary, non-moving machine part. However, the design having the coil windings on the non-moving part of the machine is normally more expedient since the coil windings, to which current is supplied and from which current is withdrawn in case of a generator, are provided on a stationary machine part, thus avoiding sliding contacts. In addition thereto, the possible design is to be mentioned in which both the stator and the rotor rotate at different speeds and/or in different directions of rotation, in particular when they are connected via a transmission or parts of a transmission, e.g. a planetary gear train. The electric machine according to the invention preferably is designed with electronic activation and deactivation of the coil winding currents. By means of a suitable sensor or due to electric information on the feeding of the electric motor, the rotational relative position between stator part and rotor part is determined; the current through the coil windings each time is turned on and off at the proper moment of time. Suitable electric circuits and suitable electronic components for realizing the described current control with respect to electric motors and current withdrawal with respect to generators are known and need not be described here in more detail.

What is claimed is:

1. An electric machine (2) comprising a rotor (4) and a stator (6) arranged coaxially therewith, said rotor (4) comprising permanent magnets (14) and a magnetic yoke (12) and a bandage (16) holding together the permanent magnets (14) and the magnetic yoke (12) in use against centrifugal forces, the bandage (16) being arranged on the rotor (4) with a bias which is selected that in use the bandage (16), under the effect of centrifugal forces, expands in minimum manner only, so that the bandage maintains the structural integrity of the rotor, wherein the bandage and the rotor are formed from materials such that the coefficients of thermal expansion of the rotor and the bandage in a circumferential direction differ from each other at most by 50%, wherein the bandage (16) comprises a unidirectional fiber material which is located in a plastic matrix, which fiber material is an electrically nonconductive fiber material having a coefficient of thermal expansion which is at most by a factor of 2 larger or smaller than that of the rotor (4); and wherein the ceramic fiber material has a modulus of elasticity of higher than 300 GPa.

2. The electrical machine (2) of claim 1, wherein the bandage (16) is formed as a force-fit connection from rotor (4) to rotor flange (20).

3. The electric machine (2) of claim 1, wherein the matrix material is provided such that the bandage (16) is fluid-tight.

4. The electric machine (2) of claims 1, wherein the bandage (16) is provided with a fluid-tight film.

5. The electric machine (2) of claim 4, wherein the film is a polyimide film.

6. The electric machine (2) of claim 1, wherein the bandage (16) comprises unidirectional fiber material arranged in circumferential direction.

7. The electric machine (2) of claim 1, wherein the bandage (16) comprises unidirectional fiber material arranged at an angle with respect to the circumferential direction.

8. The electric machine (2) of claim 1, wherein the bandage (16) comprises several layers of fiber material.

9. The electric machine (2) of claim 1, wherein the rotor (4) is an internal rotor.

10. The electric machine (2) of claim 1, wherein the rotor (4) is an external rotor.

11. The electric machine (2) of claim 1, wherein the stator (6) is an internal stator.

12. The electric machine (2) of claim 1, wherein the coefficient of thermal expansion of the bandage differs from the average coefficient of thermal expansion of at least one of said rotor and stator by an amount in the range of 5 to 50%.

13. The electric machine (2) of claim 1, wherein the coefficient of thermal expansion of the bandage differs from the average coefficient of thermal expansion of at least one of said rotor and stator by 20%.

14. The electric machine (2) of claim 1, wherein the coefficient of thermal expansion of the bandage differs from the average coefficient of thermal expansion of at least one of said rotor and stator by 10%.

15. The electric machine (2) of claim 1, wherein the coefficient of thermal expansion of the bandage differs from the average coefficient of thermal expansion of at least one of said rotor and stator by 5%.

16. The electric machine (2) of claim 1, wherein the coefficient of thermal expansion of the bandage differs from the average coefficient of thermal expansion of at least one of said rotor and stator by 50%.

* * * * *